May 8, 1928.

F. BEEMER 1,668,668

MOUNTING FOR BEARINGS FOR AUTOMOBILE CLUTCHES

Filed July 2, 1927     2 Sheets-Sheet 1

WITNESS:

INVENTOR
Frank Beemer
BY
Augustus B. Stoughton.
ATTORNEY.

May 8, 1928. 1,668,668
F. BEEMER
MOUNTING FOR BEARINGS FOR AUTOMOBILE CLUTCHES
Filed July 2, 1927  2 Sheets-Sheet 2

INVENTOR
Frank Beemer
BY
Augustus B. Stoughton
ATTORNEY.

WITNESS:

Patented May 8, 1928.

1,668,668

UNITED STATES PATENT OFFICE.

FRANK BEEMER, OF PHILADELPHIA, PENNSYLVANIA.

MOUNTING FOR BEARINGS FOR AUTOMOBILE CLUTCHES.

Application filed July 2, 1927. Serial No. 203,048.

The principal object of the present invention is to provide a mounting for the ball thrust bearings for automobile clutches which shall be fixed or held in respect to rotation, which shall be amply and sufficiently provided with lubricant, and which shall be of comparatively simple construction yet efficient and durable.

Another object of the invention is to provide a mounting for the purpose referred to which, with the elements of a ball thrust bearing, shall constitute a unitary structure that may be handled as such.

Other objects of the invention will appear from the following description at the end of which the invention will be claimed.

In the following description reference will be made to the accompanying drawings forming part hereof and in which—

Figure 1:
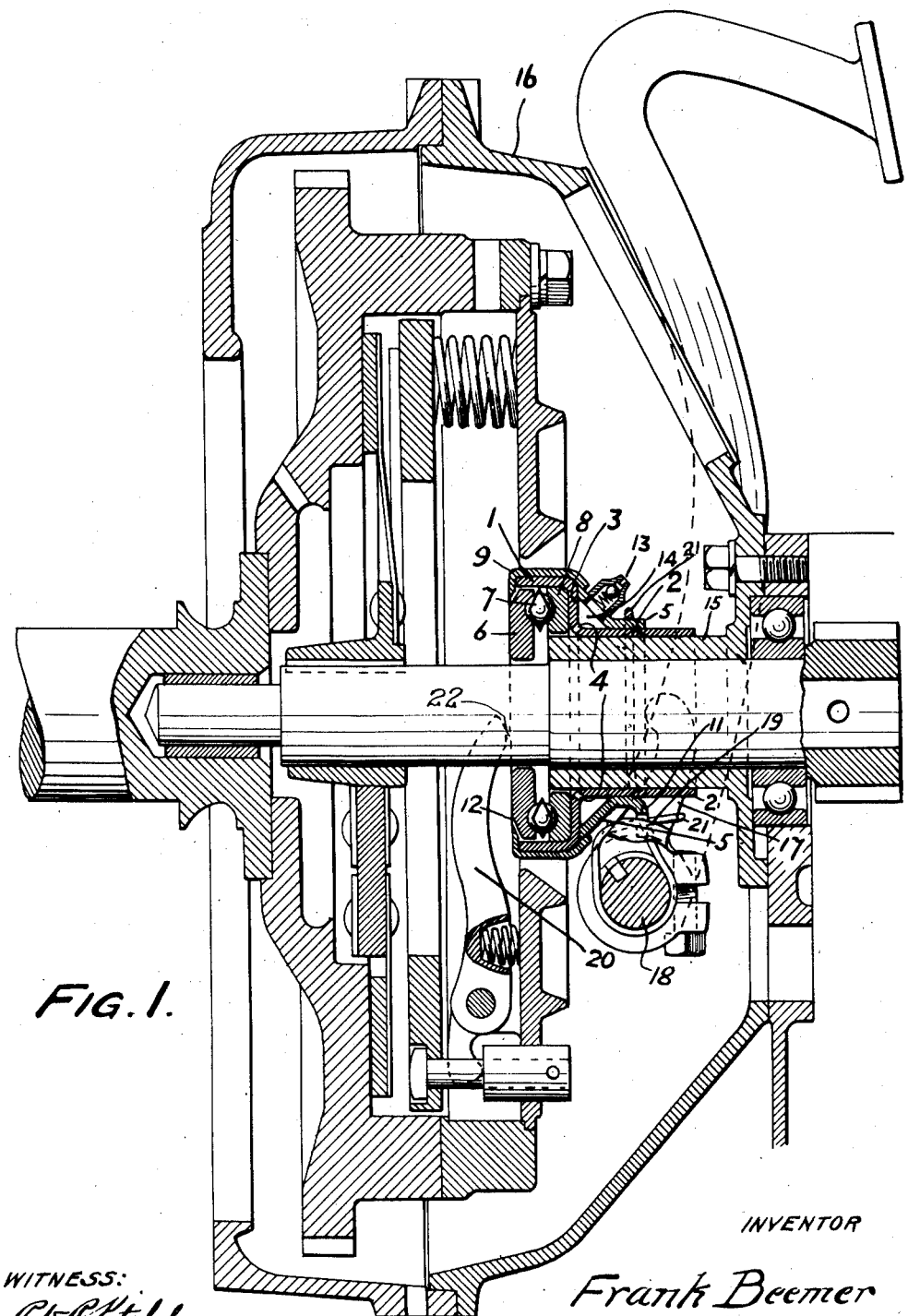
Figure 2:
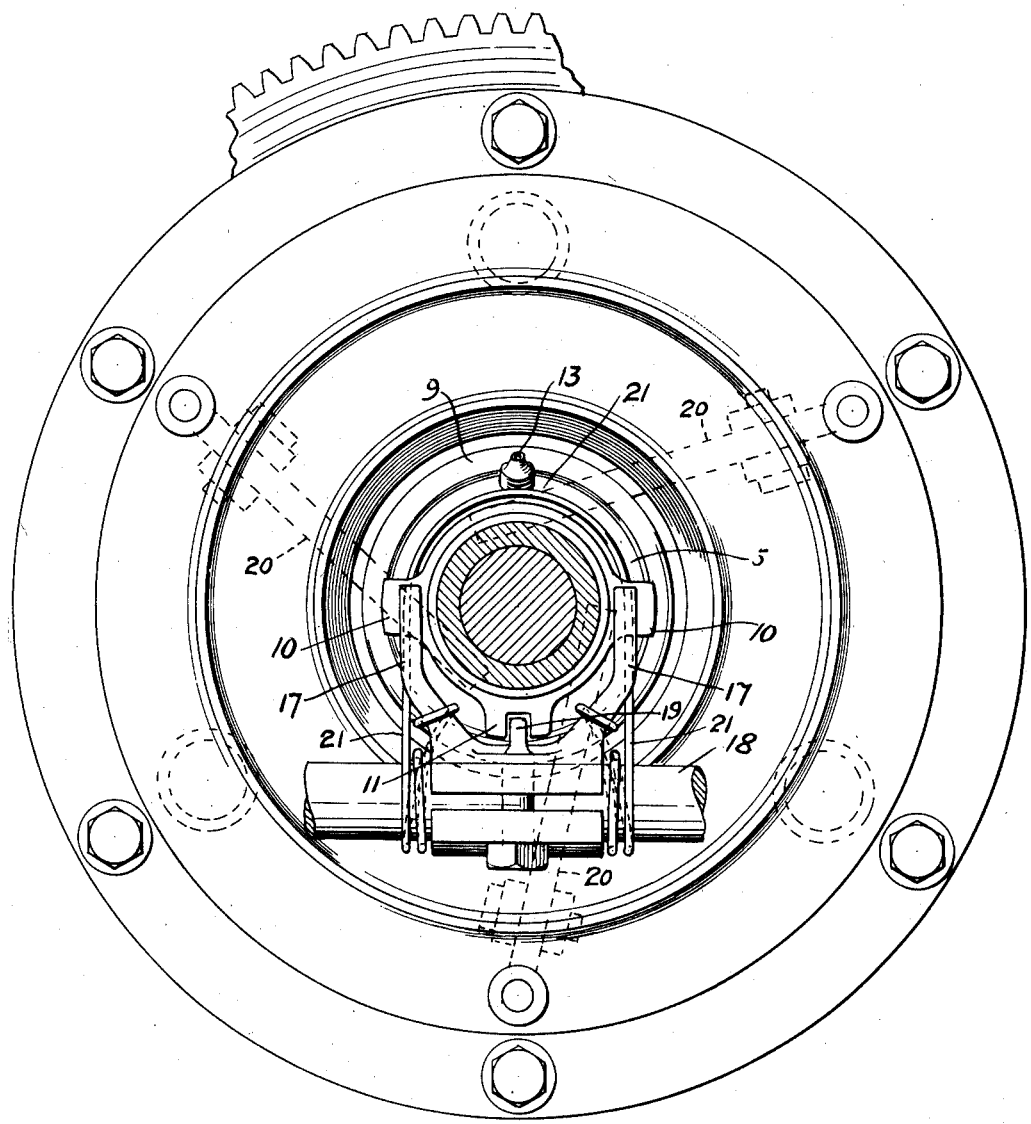

Figure 1 is a view principally in central section illustrating a mounting embodying feautres of the invention in application to an automobile clutch, and Fig. 2 is an end view of the mounting looking from right to left in Fig. 1 with parts of the clutch structure removed.

In the drawings there is an inner tubular shell having relatively large and relatively small cylindrical portions 1 and 2 and having a radially arranged wall 3 connecting those portions and provided at its inner portion with holes 4 for the passage of lubricant. There is a funnel shaped sleeve mounted on the shell with its flaring portion 5 against the wall 3 and with its stem on the small cylindrical portion 2 of the shell. The thrust ball bearing elements 6, 7 and 8 are arranged in the large cylindrical portion 1 of the shell. 9 is an inwardly flanged ring or band mounted on the large cylindrical portion 1 and arranged to retain the thrust ball bearing elements and to overlap the rim of the flaring portion of the funnel shaped sleeve. There are thrust and anchorage provisions 10 and 11, Fig. 2, and as shown they comprise portions turned outwardly from the end of the stem of the funnel shaped sleeve. It may be stated that the parts of the mounting may be stamped or punched and that the tubular shell, the funnel shaped sleeve and the inwardly flanged ring are relatively non-rotatable. The washer element 6 of the ball bearing is rotatable and it runs clear of all the parts of the mounting by reason of the provision of clearance at 12.

13 is an inlet for lubricant to the chamber provided at 14 from which chamber the lubricant, passing through the openings 4 and through the thrust ball bearing element 8, lubricates the bearing.

For the sake of a description of the mode of operation of the described mounting, an explanation will be given of it in connection with some of the parts of a typical automobile clutch. The small cylinder 2 of the shell is mounted to slide but not rotate on a hub 15 projecting forward from the front end of the transmission housing 16. Thrust arms 17 on the clutch pedal shaft 18 operate upon the thrust provisions or projections 10 of the funnel shaped sleeve, Fig. 2, and a disk or rib 19 on the pedal shaft 18 works through a slot in the anchorage provisions 11, and the purpose is to prevent rotation of the mounting while permitting of its endwise movement on the hub 15. The operating fingers 20 of the clutch, usually three in number, do not bear upon the element 6 of the thrust ball bearing when the car is in operation and the bearing is at rest because clearance is provided as at 22, and there is some movement of the clutch pedal before the element 6 comes into contact with the clutch fingers 20. The purpose of the provision of the clearance at 22 is to insure that there is no pressure on the cltuch while the car is in operation, which pressure, if present, might tend to cause slippage. There is a spring 21 shown as looped around the funnel shaped sleeve, wound around the clutch pedal shaft 18, and hooked to the thrust arms 17, and the purpose is to insure that the mounting will follow the movement of the arms 17.

When the clutch is engaged neither the mounting nor any of the ball bearing elements are in motion. When the clutch is disengaged the ball bearing elements 6 and 7 are in rotation but the rest of the mounting is at rest.

The small springs, of which one is shown in Fig. 1 between the fly wheel cover and the clutch fingers, operate when the clutch is disengaged to position the fingers, as shown in that figure and in that way facilitate the provision of the clearance of 22.

It will be obvious to those skilled in the art to which the invention relates that modifications may be made in details of construction and arrangement and in matters of mere form without departing from the spirit of the invention which is not limited to such matters or otherwise than the prior art and the appended claims may require.

I claim:

1. A mounting for bearings for automobile clutches including an inner tubular shell having relatively large and relatively small cylindrical portions and having a radial wall connecting those portions, a funnel shaped sleeve mounted on the shell with its flaring portion against said wall and with its stem on said small cylindrical portion, thrust ball bearing elements arranged in said larger cylindrical portion, an inwardly flanged ring mounted on the large cylindrical portion and arranged to retain the thrust ball bearing elements and to overlap the rim of the flaring portion, and thrust and anchorage provisions projecting from the mounting.

2. A mounting for bearings of automobile clutches comprising an inner tubular shell having cylindrical portions of different sizes and having a radial wall connecting those portions and provided at its inner part with holes for the passage of lubricant, a funnel shaped sleeve having a lubricant inlet and mounted on the shell with its flaring portions against said wall and with its stem on the smaller cylindrical part of the shell, thrust ball bearing elements arranged in the larger cylindrical portion of the shell and providing through one of them a passage for lubricant, an inwardly flanged ring mounted on the larger cylindrical portion and arranged to retain the thrust ball bearing elements and to overlap the rim of the flaring portion of the sleeve, and thrust and anchorage provisions projecting from the mounting.

3. In an automobile clutch a hub provided on the transmission housing, a pedal shaft having thrust arms, clutch actuating fingers, a tubular shell slidably mounted on the hub and having an enlarged cylindrical portion and a radial wall perforated near the hub, a funnel shaped sleeve having a lubricating inlet and mounted on the shell with its flaring portion against said wall and the stem of said sleeve provided with a slotted anchorage ear and with projecting thrust arms, a rib on the pedal shaft arranged through the slot of the anchorage ear to permit sliding motion and prevent rotary motion of the shell and parts carried thereby, thrust ball elements arranged in the enlarged cylindrical portion of the shell and of which one is in contact with the clutch fingers, and an annular flanged ring mounted on the enlarged cylindrical portion of the shell and arranged to overlap the flaring portion of the sleeve and to prevent detachment of the ball bearing element with which the fingers engage.

4. In an automobile clutch a hub provided on the transmission housing, a pedal shaft having thrust arms, clutch actuating fingers, a tubular shell slidably mounted on the hub and having an enlarged cylindrical portion and a radial wall perforated near the hub, a funnel shaped sleeve having a lubricating inlet and mounted on the shell with its flaring portion against said wall and the stem of said sleeve provided with a slotted anchorage ear and with projecting thrust arms, a rib on the pedal shaft arranged through the slot of the anchorage ear to permit sliding motion and prevent rotary motion of the shell and parts carried thereby, thrust ball elements arranged in the enlarged cylindrical portion of the shell and of which one is in contact with the clutch fingers, an annular flanged ring mounted on the enlarged cylindrical portion of the shell and arranged to overlap the flaring portion of the sleeve and to prevent detachment of the ball bearing element with which the fingers engage, and a spring interposed between the thrust arms and the mounting of the ball thrust bearing.

FRANK BEEMER.